United States Patent [19]
Soikkeli

[11] Patent Number: 5,378,424
[45] Date of Patent: Jan. 3, 1995

[54] PROCESS FOR CURING PIPE INSULATION

[75] Inventor: Osmo Soikkeli, Lappeenranta, Finland

[73] Assignee: Oy Partek Ab, Parainen, Finland

[21] Appl. No.: 130,004

[22] Filed: Sep. 30, 1993

Related U.S. Application Data

[63] Continuation-in-part of Ser. No. 871,562, Apr. 17, 1992, which is a continuation of Ser. No. 555,428, Sep. 11, 1990, abandoned.

[30] Foreign Application Priority Data

Feb. 12, 1988 [FI] Finland ................... 880667

[51] Int. Cl.⁶ ............... B29C 35/04; F16L 59/02
[52] U.S. Cl. .................. 264/313; 264/109; 264/161; 264/324; 264/332; 264/163
[58] Field of Search ............... 264/324, 109, 122, 161, 264/319, 313, DIG. 48, 332, 163

[56] References Cited

U.S. PATENT DOCUMENTS

| | | |
|---|---|---|
| 2,127,404 | 8/1938 | Gullich . |
| 2,778,759 | 1/1957 | Stephens et al. ............ 264/324 |
| 2,949,054 | 8/1960 | White ............ 264/324 |
| 3,502,767 | 3/1970 | Morrison et al. ............ 264/324 |

FOREIGN PATENT DOCUMENTS 1525860 8/1969 Germany .

*Primary Examiner*—Mathieu D. Vargot
*Attorney, Agent, or Firm*—Scully, Scott, Murphy & Presser

[57] ABSTRACT

The present invention essentially relates to a process for curing pipe insulation, including the employment of a two-part mold and the utilization of a device for the passage of curing air through the mold and through a pipe insulation preform which is arranged around a core disposed within the mold. The process for the curing of insulating chutes constituted of a fibrous materials, such as wool or the like, completely avoids the formation of any burrs which can conceivably be formed between interengaging and cooperating mold halves, one of which is a female and the other a complementary male component. A sharp and flexible leading edge in the male part is arranged to come into contact with the inner surface of the female part and to slide therealong before making contact with a preform for producing the pipe insulation, which is preferably a thermal wool material.

5 Claims, 1 Drawing Sheet

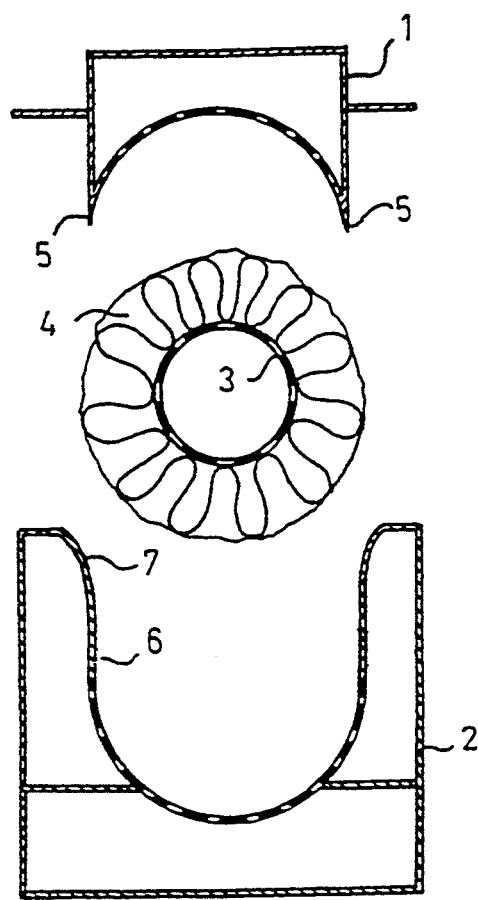
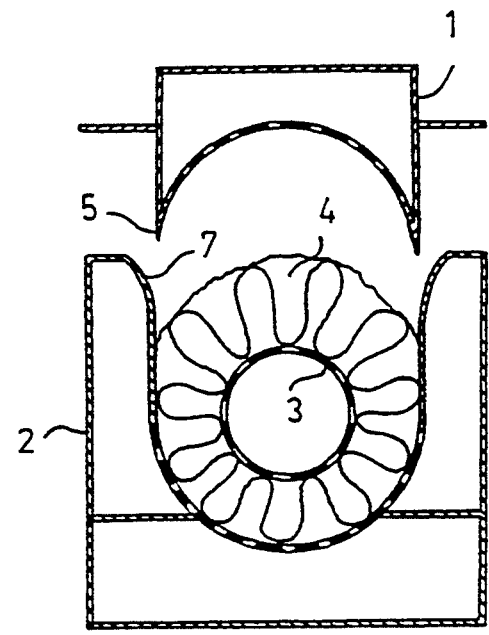
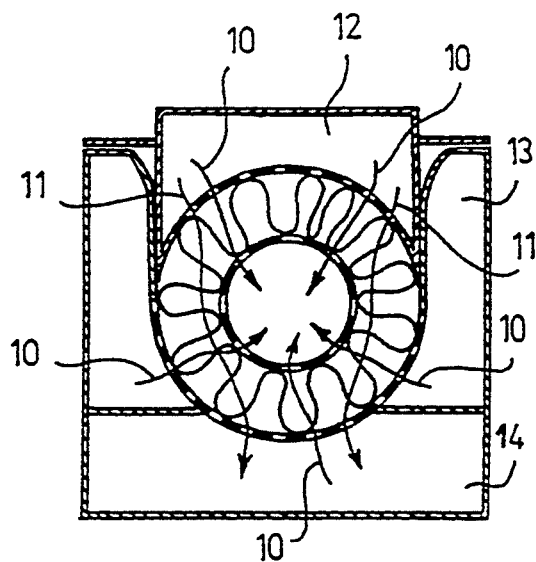
FIG. 1
FIG. 2
FIG. 3

5,378,424

PROCESS FOR CURING PIPE INSULATION

CROSS-REFERENCE TO RELATED APPLICATION

This application is a continuation-in-part patent application of Ser. No. 07/871,562, filed Apr. 17, 1992; which is a continuation application of Ser. No. 07/555,428, filed Sep. 11, 1990, now abandoned.

BACKGROUND OF THE INVENTION

1. Field of the Invention

The present invention essentially relates to a process for curing pipe insulation, comprising the employment of a two-part mold and to the utilization of a device for the passage of curing air through the mold and through a pipe insulation preform which is arranged around a core disposed within the mold.

2. Discussion of the Prior Art

A process for the production of insulating sleeves for conduits or pipe members is disclosed in German Laid-Open Patent Appln. No. 1 525 860. In that instance, two cooperating, complementary die or mold halves are adapted to produce a pipe insulation consisting of either a single layer or plurality of layers of an insulating material, such as a synthetic fibrous wool-like material which is impregnated with a synthetic resin. The mold halves are essentially identical in nature and press rolled matting of this insulating material into suitable pipe insulation structure. There is no structure provided which will prevent the formation of burrs.

Stephens et al U.S. Pat. No. 2,778,759 discloses a thermal pipe insulation constituted of a substantially flexible material, wherein the resilience of matting which is rolled into a cylindrical pipe-shaped form enables a pair of cooperating mold halves to apply air pressure to the interior of the resilient material so as to enable the formation of the finished pipe structure, The mold halves are essentially identical in configuration and are clamped together to form the pipe construction from the flexible or resilient material which is of a wool-like texture.

A disadvantage of Stephens et al. resides in that it is impossible to prevent the formation of burrs on the outer surface of the chute which is formed by the wool-like material at the plane in the juncture between the mold halves. The mold halves are unable to make full contact with each other due to the burrs formed by the wool materials spreading between contacting mold plans. Consequently, the process in Stephens et al. would not be satisfactory for forming insulating chutes in a manner analogous contemplated by the inventive process.

Finally, Gullich U.S. Pat. No. 2,127,404 relates to a process and apparatus in which cooperating mold halves are adapted to press powder materials into tablets with a concurrently shearing of the end surface of the pressed material into predetermined tablet thicknesses to provide discrete pressed tablet structures. There is no disclosure of any process for the curing of insulating chutes in a manner analogous to that contemplated by the present invention.

SUMMARY OF THE INVENTION

Accordingly, it is an object of the present invention to provide a novel and unique process for the curing of insulating chutes constituted of a fibrous material, such as mineral wool or the like, which completely avoids the formation of any burrs which can conceivably be formed between interengaging and cooperating mold halves, one of which is a female and the other a complementary male component.

The apparatus for implementing the process for curing insulating chutes according to the present invention is primarily constituted of a two-part mold including a male part and a female part, and wherein a leading edge in the male part is arranged to come into contact with the inner surface of the female part and to slide therealong before making contact with a preform for producing the pipe insulation, which is preferably a thermal wool material.

Preferably, the leading edge of the male part is sharp and flexible or resilient in nature, whereas the female part comprises a straight guide surface which extends from the diametral plane of the pipe insulation towards the male part and then terminates in a widening receiving opening. The flexible leading edge of the male part is configured so as to come into contact with the inner surface of the female part within the area of the widening receiving opening.

Inasmuch as the leading edge of the male part slides along the inner surface of the cooperating female part in close contact therewith, no opening or gap enabling the formation of a burr during the curing remains between the mold parts, so as to provide for the formation of a smooth-surface insulating chute.

For large-sized insulating chutes, generally having an inner diameter of 90 mm or more, it is preferable to use a perforated core and pass a flow of curing air from each one of the mold parts through the insulating pipe preform into the core cavity, or conversely outwardly through the core.

On the other hand, for small-sized chutes less than 90 mm, it is preferable to employ a solid core, and to pass curing air from one mold part through the pipe insulation preform into the other mold part.

BRIEF DESCRIPTION OF THE DRAWINGS

Hereinbelow the invention is now described in further detail taken in conjunction with the acccmpanying generally diagrammatic drawings; in which:

FIG. 1 illustrates a mold for curing insulating chutes shown in an open position;

FIG. 2 illustrates the mold in a partially closed position; and

FIG. 3 illustrates the mold in a fully closed position.

DETAILED DESCRIPTION

Reference numeral 1 designates the male part of the curing mold; reference numeral 2 identifies the female part of the mold; reference numeral 3 indicates a core; and reference numeral 4 a pipe insulation preform which is arranged around the core, such insulation being preferably a wool-like material; i.e. a thermal wool. Both the male part 1 and the female part 2 of the mold include a perforated inner surface, which is preferably semi-cylindrical in shape.

The male part 1 preferably comprises a sharp flexible or resilient leading edge 5, whereas the inner surface of the female part 2 of the mold extends from the diametral plane of the semi-cylinder towards the male part, preferably in the form of a straight guide surface 6 terminating in a widening receiving opening 7.

The core 3 together with the insulating pipe preform 4, supported, for instance, at the ends thereof by a transporter (not shown), is brought into the open mold to assume a position as shown in FIG. 1. The female part 2 of the mold is lifted up to a position as shown in FIG. 2; whereafter the male part 1 of the mold is lowered into the position shown in FIG. 3.

The flexible leading edges 5 of the male part 1 preferably first come into contact with the inner surface of the receiving opening 7 in the female part 2 and then continue to slide forwardly along the guide surface 6, being pressed responsive to the flexible nature thereof against the guide surface 6 until the preform 4 comes into contact with the semi-cylindrical surface of the male part 1. The leading edges 5 of the male part thereby extend approximately up to the diametral plane of the semi-cylindrical surface of the female part.

When, as in the specific case of the drawing, the pipe insulation is large in size; in effect, the inner diameter thereof is generally at least about 90 mm, the core 3 which is to be employed is perforated and a flow of curing air is passed through each one of the hollow mold parts 1 and 2 through the pipe insulation preform 4 into the internal cavity of the core 3, as shown by arrows 10 in FIG. 3. It is understood that the flow of curing air may be passed conversely outwardly from the core into the mold parts as well. With the use of a small-sized chute, it is preferably to use a solid core and to pass a flow of curing air; for instance, from a cavity 12 in the male part 1 through the chute preform 4, as represented by arrows 11 in FIG. 3, into a cavity 14 present in the female part 2 of the mold. In this case, the female part 2 of the mold is preferably divided into two cavities 13 and 14, whereby the air pressure reigning in the cavity 13 is atmospheric.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A process for curing a pipe insulation comprising a thermal wool material in a two-part mold of an air-permable apertured construction and wherein a pipe insulation preform constituted of said thermal wool material is arranged around a core disposed in said mold, said mold including a male mold part having a generally semi-cylindrical apertured inner surface terminating on both longitudinal sides in a leading edge, each said leading edge of the male mold part terminating in a sharp flexible pointed end portion; comprising:
    (a) positioning said pipe insulation preform in a female mold part of said mold;
    (b) inserting said male mold part into said female mold part, said female mold part having an inner surface comprising a generally semi-cylindrical apertured portion which on both longitudinal sides thereof continues in a guide surface for surface contact with at least the flexible end portions of the leading edges of surface of the male mold part prior to the semi-cylindrical inner surface of the male mold part coming into contact with the pipe insulation preform to inhibit the formation of burrs from said thermal wool material;
    (c) and concurrently passing curing air through said apertured mold surfaces and through said pipe insulation preform to effectuate the curing of said pipe insulation preform.

2. A process according to claim 1, wherein said inner semi-cylindrical surface of said female mold part extends into a straight guide surface on each side thereof facing towards the male mold part, each said side terminating in a widening receiving opening for said leading edges of said male mold part.

3. A process according to claim 2, comprising contacting each leading edge of the male mold part with an adjoining inner surface of the female mold part within the region of said widening receiving opening to prevent the formation of burrs.

4. A process according to claim 1, wherein said core is impervious to the flow of curing air, comprising passing a flow of said curing air externally of said core through said pipe insulation preform.

5. A process according to claim 1, wherein said core is perforated, comprising passing a flow of said curing air from each one of said mold parts through the insulating pipe preform into the core cavity, or conversely outwardly from the core into the mold parts.

* * * * *